United States Patent [19]
Gunn

[11] Patent Number: 5,788,274
[45] Date of Patent: Aug. 4, 1998

[54] AIRBAG FLOW DIVERSION WALLS FOR HOT DEPLOYMENT PERFORMANCE LEVELLING

[76] Inventor: Brian D. Gunn, 1520 26th St., Ogden, Utah 84401

[21] Appl. No.: 763,140

[22] Filed: Dec. 10, 1996

Related U.S. Application Data

[63] Continuation of Ser. No. 559,403, Nov. 15, 1995, abandoned.

[51] Int. Cl.$^6$ ................................................. B60P 3/22
[52] U.S. Cl. .................................... 280/736; 280/737
[58] Field of Search ............................. 280/736, 737, 280/740, 742, 741, 738, 739, 728.2

[56] References Cited

U.S. PATENT DOCUMENTS

| | | | |
|---|---|---|---|
| 5,217,249 | 6/1993 | Kokeguchi | 280/728 |
| 5,226,670 | 7/1993 | Wright et al. | 280/783 |
| 5,269,561 | 12/1993 | Davis et al. | 280/736 |
| 5,431,432 | 7/1995 | Webber et al. | 280/728.2 |
| 5,472,229 | 12/1995 | Bishop et al. | 280/728.2 |

Primary Examiner—Brian L. Johnson
Assistant Examiner—Jonathan E. Butts

[57] ABSTRACT

A passenger side airbag module is provided with walls for diverting the excess portion of the gas generated by an inflator during an above normal temperature deployment of the air bag cushion so that over-pressurization of the air bag cushion does not occur.

1 Claim, 2 Drawing Sheets

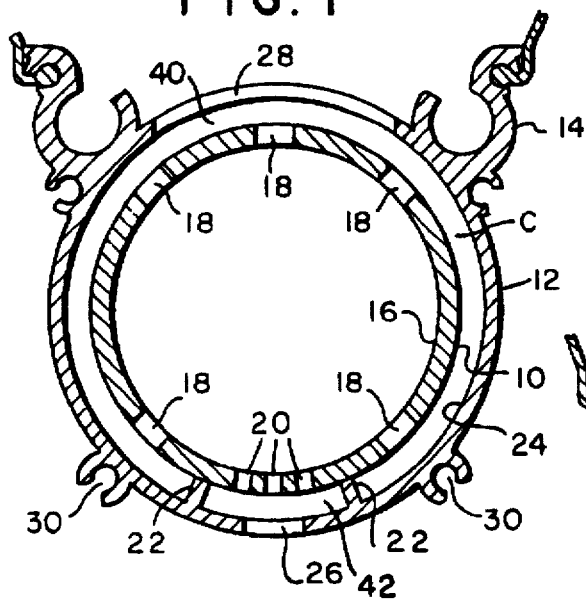
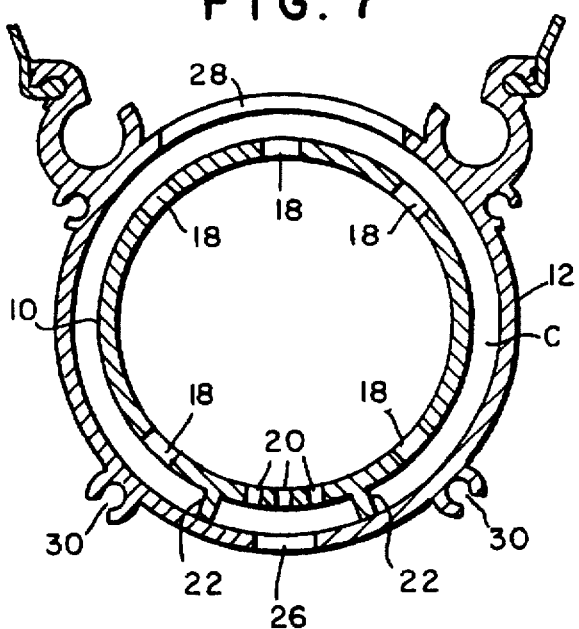
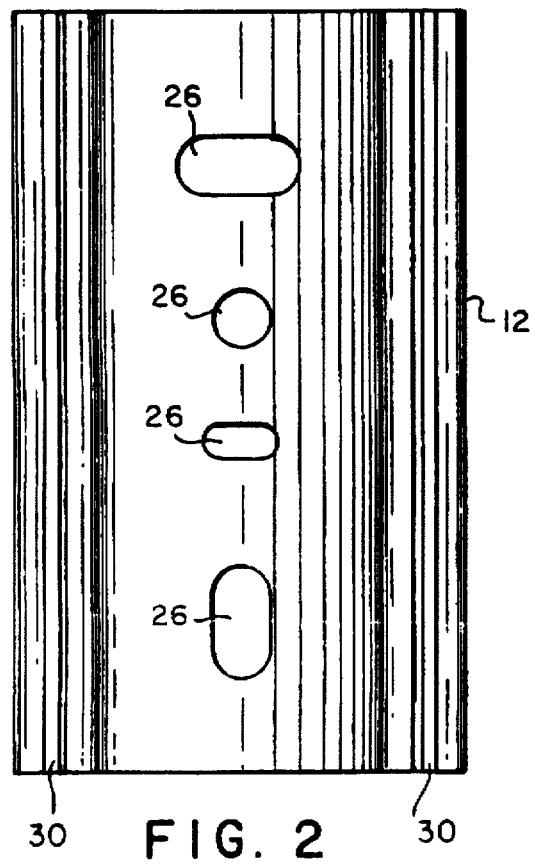

FIG. 3
FIG. 5
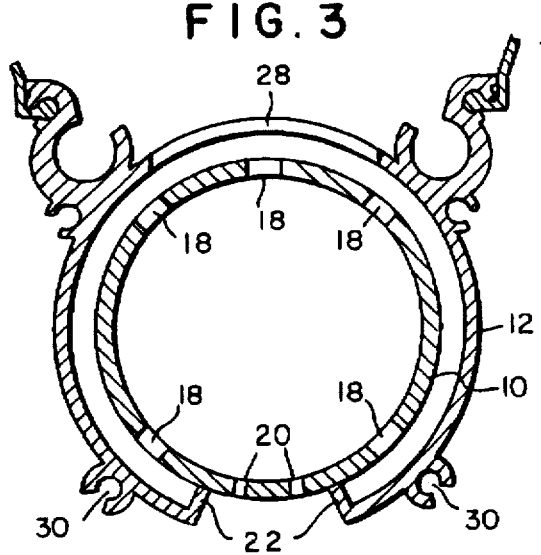
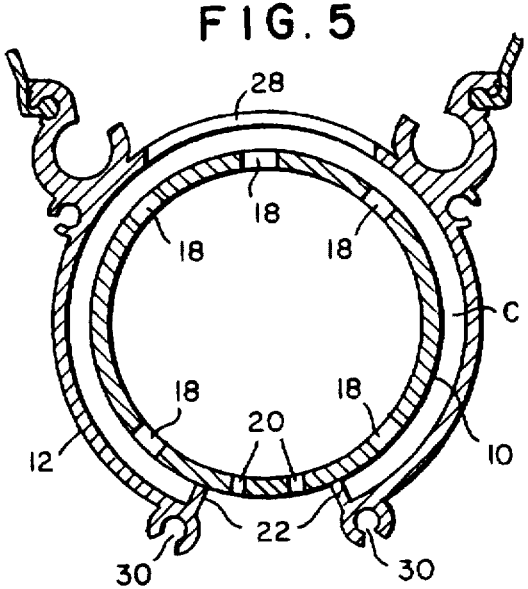
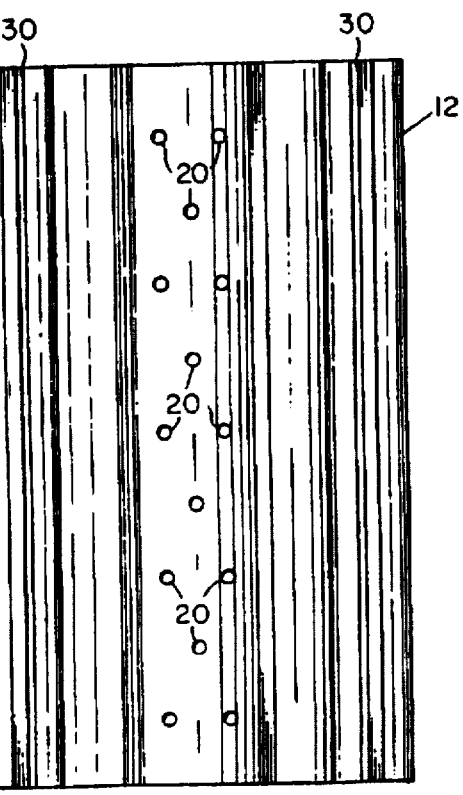
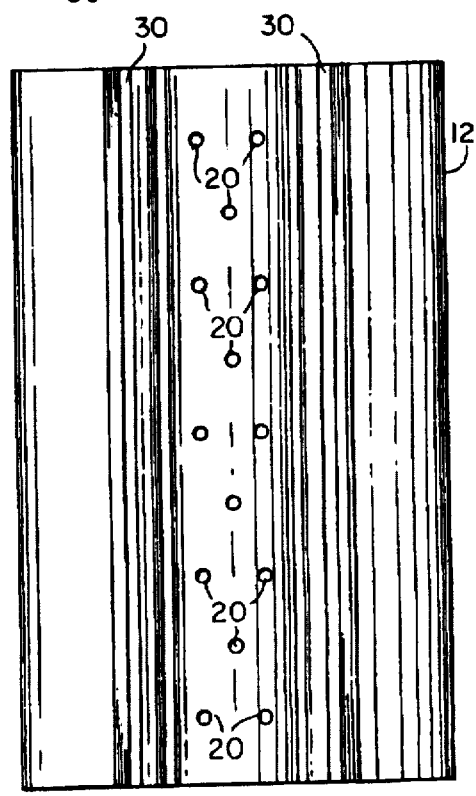
FIG. 4
FIG. 6

AIRBAG FLOW DIVERSION WALLS FOR HOT DEPLOYMENT PERFORMANCE LEVELLING

This is a continuation of application Ser. No. 08/559,403 filed on Nov. 15, 1995, now abandoned.

This invention relates to passenger side airbag modules. More particularly it relates to means which function to level deployment performance during hot deployment of the airbag cushion.

BACKGROUND OF THE INVENTION

Typical automotive passenger airbag systems consist of a gas generator, an inflatable cushion and a housing. Most systems use a cylindrical pyrotechnic type gas generator. As described in Davis et al., U.S. Pat. No. 4,380,346 issued Apr. 19, 1983, one of the characteristics of a pyrotechnic gas generator is that as the environmental (ambient) temperature increases, the rate of gas generation also increases. This change in burn rate causes a corresponding change in cushion deployment performance. During a hot temperature deployment, the cushion fills faster and more aggressively than during a cold or normal temperature deployment. Since most crash induced deployments occur around the normal temperature range, this creates a need for a low cost method to reduce the stress levels on the cushion and housing when a hot temperature deployment occurs. To compensate for this, Davis et al. provide perforations in the inflator housing and foil covers for the perforations designed to rupture at desired pressures.

Another solution to the problem of disposing of the excess gas generated during hot deployments is described in Goetz et al U.S. Pat. No. 4,817,828 issued Apr. 4, 1989. This patent describes an inflator with cold and ambient ports on one side of the inflator and hot ports on the opposite side. The module housing is attached to one side of the inflator with the gas issuing from the cold and ambient ports discharging into the airbag cushion and the hot ports discharging excess gas in the opposite direction outside the module. Furthermore, in the device described in Goetz U.S. Pat. No. 4,817,828, the module wraps only partially around the inflator. With all the hot ports on one side the inflator filter is only half used and the inflator is thrust directional, not thrust neutral.

Other prior art includes module designs described in Morton U.S. patent application, recently filed in the United States Patent Office as Ser. No. 08/517,783 filed Aug. 22, 1995, and U.S. Ser. No. 08/519,865 filed AUG. 25, 1995, each of which describes means for relieving the excess pressure generated during hot deployments.

In the present invention walls are provided to segregate certain of the inflator ports and to divert some of the gas flow to the outside of the module instead of into the airbag cushion, thereby avoiding over pressurization of the airbag cushion during deployment.

OBJECTS

One object of the invention is to divert excess inflator gas out of the airbag module instead of into the airbag cushion, during hot deployments.

Another object of the invention is to divert gas issuing from an inflator out the back of an airbag inflator module during a deployment wherein excess gas is generated by an airbag inflator.

Still another object of the invention is to provide an airbag module having means to divert a portion of the inflator generated gas from entry into an airbag cushion to avoid over pressurization of the airbag cushion.

A further object of the invention is to divert gas flow out the back of the module during hot temperature deployments, while still having a thrust-neutral pipe-type inflator.

A further object of the invention is to provide a passenger side airbag inflation device which includes means for diverting the excess portion of the inflating gas directly into the atmosphere instead of into the airbag cushion during a hot deployment.

Another object of the invention is to provide a module which bends during a hot deployment to vent excess gas generated during a hot deployment.

DESCRIPTION OF THE DRAWINGS

These and other objects will be pointed out or will become evident from the description which follows taken in conjunction with the drawings in which:

FIG. 1 is a schematic view in section of a portion of an airbag module containing a pipe type inflator;

FIG. 2 is a view showing various module hot vent hole shapes;

FIG. 3 is a view similar to FIG. 1 of a modification of the device of FIG. 1;

FIG. 4 is a view from the rear of the device showing an arrangement of hot vent holes for the device of FIG. 3;

FIG. 5 is a view similar to FIG. 1 of a second modification of the device of FIG. 1;

FIG. 6 is a view similar to FIG. 4 showing arrangement of hot vent holes in the device of FIG. 5; and FIG. 7 is a further modification of the device of FIG. 1.

As shown in FIG. 1, the passenger side airbag inflation device of this invention includes a pipe-type inflator 10 and a module housing 12. The module housing 12 may be an aluminum alloy extrusion of the kind described in the following recent United States Patents issued to Morton International: 5,407,226 and 5,407,227 issued Apr. 18, 1995; 4,941,678 issued Jul. 17, 1990; and 5,332,256 issued Jul. 26, 1994 the disclosures of which are incorporated by this reference. Instead of an aluminum extrusion, the module housing may be a stamped steel member. Means 14 are provided on the exterior of the module housing for attaching the module housing 12 to a vehicle, as known in the art.

The pipe-type inflator 10 includes suitable means for supporting it within the module housing 12 and spaced from the inside walls of the housing, such as the stud on the inflator canister shown in Lauritzen et al, U.S. Pat. No. 5,332,256 issued Jul. 26, 1994, the disclosure of which is incorporated by this reference. Any other known means for supporting pipe-type inflator canisters inside a module housing may be used. When so supported a clearance C is provided between inflator canister 10 and module housing 12.

Inflator 10 has a wall 16 which is provided with several sets of ports for the discharge of gas generated by a conventional gas generant package housed in the inflator. For cold temperature or ambient temperature deployments a plurality of ports 18 are spaced in the forward facing portion of the inflator wall 16. Another group of ports 20 in the inflator wall for hot temperature deployments is located at the rear facing portion of the inflator wall 16. Ports 20 are sealed with foil and remain closed until excess pressure is developed in a hot deployment. All ports are similarly sealed to keep out moisture.

In the module housing 12 of the present invention two diverter walls 22 are provided for segregating the flow of gas from inflator 10. Diverter walls 22 are legs or ribs which extend inwardly from the inside surface 24 of the module housing 12 and are perpendicular to the inner surface 24 of the module housing 12. In this way the volume between canister the exterior canister 10 and the interior module housing 12 is divided into a forward zone 40 and rearward zone 42.

In the portion of the module housing between the two diverter walls 22 of the module housing, there is at least one rearwardly facing hot vent port 26, so that during hot deployments, excess portions of the gas from the inflator can flow directly out of the module housing while most of the gas flows from the inflator 10 into the airbag cushion, in the usual way through ports 18 in the inflator into space 40 and out through port 28 in the module housing. In this way the volume between canister 10 and module 12 is divided into a forwardly facing zone 40 and a rearwardly facing zone 42.

On the exterior surface of module housing 12, in addition to means 14 for attaching the module housing to a vehicle, there are slots 30 for receiving screws by means of which end plates(not shown) are attached to the ends of the module housing, e.g. as described in the previously noted Morton International U.S. Patents.

As shown in FIG. 2, the hot vent ports may have any of several shapes and need not all be of the same size or shape.

In FIG. 3 the module housing 12 does not completely encircle the inflation canister and the diverter walls 22 are located at the ends of the module housing 12, instead of being offset from the ends of the module housing as shown in FIG. 1. The space between said walls constitutes the hot vent port in said module housing 12.

In FIG. 5 the diverter walls 22 are located at the ends of the module housing 12 and two of the end plate screw slots 30 are also located at the ends of the module housing.

The diverter walls 22 need not be on the module housing extrusion. Instead they may be located on the exterior of the inflator pipe casing, as shown in FIG. 7.

In the event that an unusually large volume of gas is generated during a hot deployment, the ends plates of the module housing 12 may bow outwardly to cause the diverter walls to separate sufficiently from the inflator to permit venting of some of the excess gas between the inflator and the module housing.

Having now described the invention it is not intended that it be limited except as defined in the appended claims.

I claim:

1. A thrust neutral passenger side airbag cushion inflation device comprising:

an inflator including means for generating a gas to inflate an airbag cushion, said inflator having a casing pipe with a forward facing side and a rearward facing side;

a module housing said module housing having an external surface and an internal surface, said inflator casing pipe being supported within said module housing and spaced from said internal surface of said module housing by a space, said module housing only partially encircling said inflator casing pipe;

at least one forwardly facing port in said casing pipe and at least one rearwardly facing port in said inflator casing pipe;

and means on the internal surface of said module housing for separating the space between said inflator casing pipe and said module housing into a forwardly facing zone and a rearwardly facing zone said means comprising inwardly directed ribs at the ends of said module housing, extending inwardly from the interior of said housing toward said inflator casing pipe to act as diversion walls for a portion of the gas generated by said inflator, said rearwardly facing zone between said ribs constituting a hot vent port for said module housing.

* * * * *